United States Patent [19]

Savi

[11] 4,342,726

[45] Aug. 3, 1982

[54] MACHINE FOR STERILIZING FOODSTUFFS IN CYLINDRICAL CONTAINERS AT NORMAL ATMOSPHERIC PRESSURE

[75] Inventor: Antonio Savi, Parma, Italy

[73] Assignee: Officine Meccaniche Savi Antonio S.p.A., Italy

[21] Appl. No.: 286,357

[22] Filed: Jul. 23, 1981

[30] Foreign Application Priority Data

Apr. 13, 1981 [IT] Italy .............................. 40040-A/81

[51] Int. Cl.³ ................................................ A23P 3/04
[52] U.S. Cl. ..................................... 422/302; 99/361;
198/491; 211/74; 211/122; 422/304
[58] Field of Search ..................... 422/26, 28, 300, 302,
422/304; 99/361, 362; 198/373, 379, 411, 495,
491; 211/74, 121, 122

[56] References Cited

U.S. PATENT DOCUMENTS

| 1,108,539 | 8/1914 | Zahm | 422/26 X |
| 2,427,811 | 9/1947 | Rich | 422/304 |
| 2,544,007 | 3/1951 | Cook | 422/304 |
| 2,893,536 | 7/1959 | Jones | 198/491 X |
| 3,340,791 | 9/1967 | Mencacci et al. | 99/362 |
| 3,575,713 | 4/1971 | Duff et al. | 422/304 X |
| 3,945,796 | 3/1976 | Nagamatsu et al. | 422/302 X |
| 4,195,061 | 3/1980 | Kalasek | 422/26 X |
| 4,279,858 | 7/1981 | Huling | 99/361 X |

FOREIGN PATENT DOCUMENTS

| 1492032 | 8/1967 | France | 422/304 |
| 712088 | 7/1966 | Italy | 422/302 |
| 660586 | 11/1951 | United Kingdom | 422/304 |

Primary Examiner—Richard L. Chiesa
Attorney, Agent, or Firm—Lowe, King, Price & Becker

[57] ABSTRACT

The machine comprises a longitudinal cage (G) which provides pilgrim step movement, composed of a succession of rectangular and vertical frames (9) connected by their flanks to two pairs of longitudinal longerons (8); the cage furnished with a succession of pairs of lateral rollers (29); each said roller pair supported by a pair of saw-toothed cams (14) beneath, the latter mounted on and rotating with respect to a basic framework (16) and placed in rotation by way of rod-and-crank linkage (19, 20 & 21) so as to effect an alternating step (A); the basic framework's (16) flanks (7) interconnected uppermost by traverses (6) bearing a series of transversely duplicated longitudinal roller lengths (2); the said rollers revolving in like direction; each of the pairs of said revolving rollers giving place to a longitudinal support (18), fixed therebetween to the said succession of frames (9) beneath and extending uppermost into a pair of upward-facing V-shaped wings (26) designed to raise up a relative line of cans (1) rotating upon the respective pair of contiguous rollers (2) in order to effect a single step forward of same (1) for each lift-and-forward stroke of the cage (G); the cage being located within a tunnel (T) in whose first stage sterilizing vapor is utilized, and in whose further stage the cans are cooled by chilled and atomised water and, eventually, dried by propelled air.

4 Claims, 10 Drawing Figures

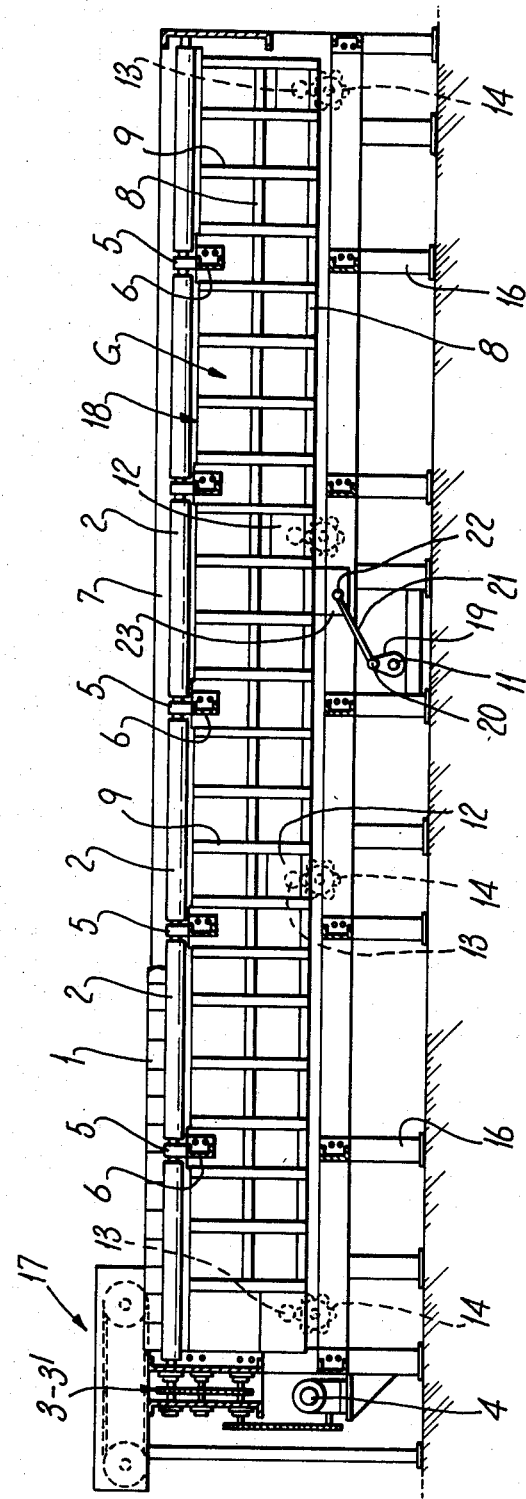

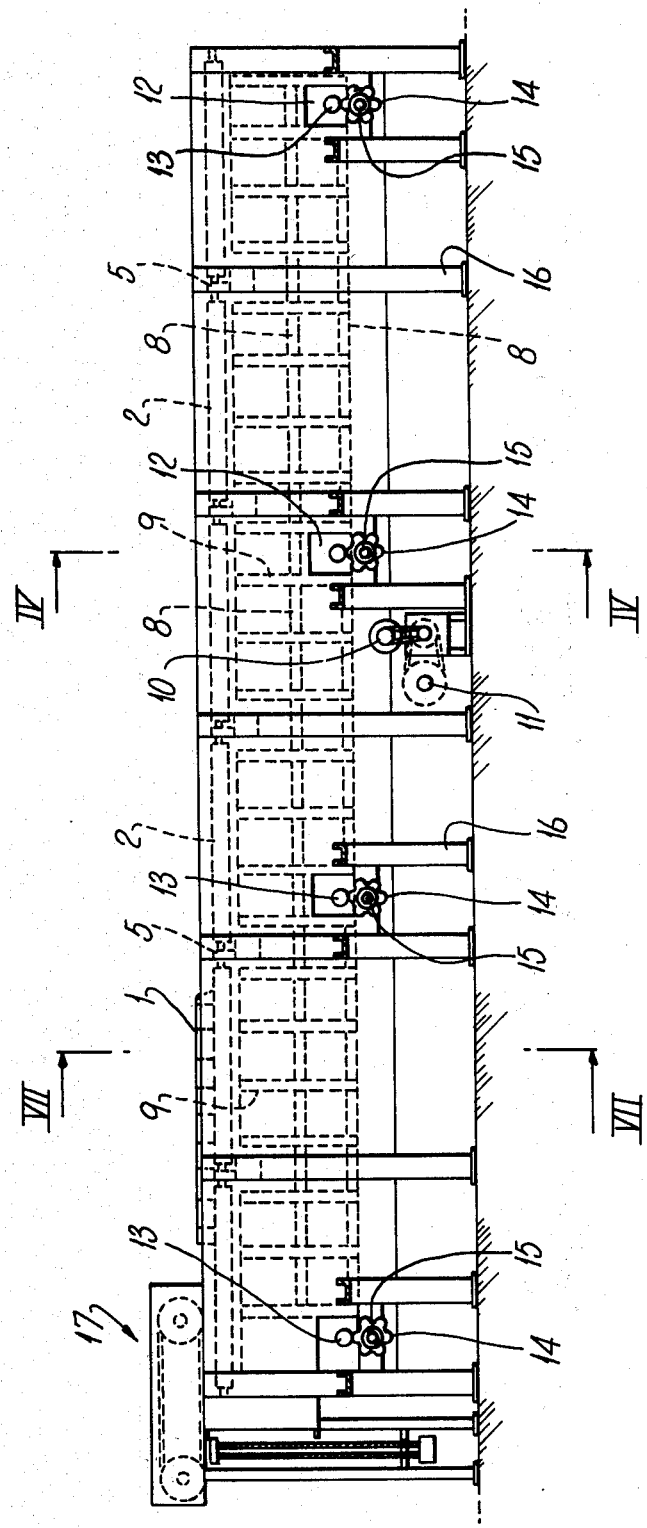

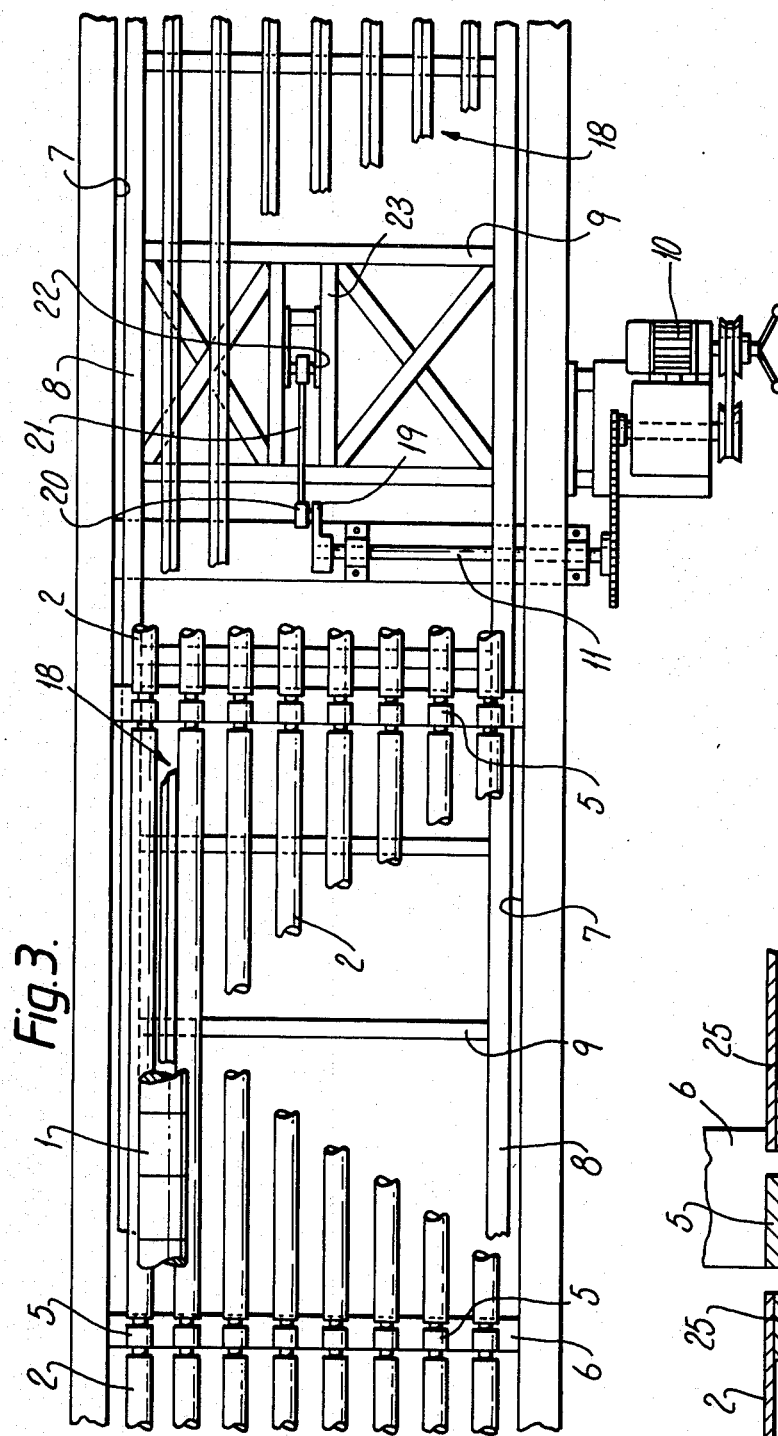
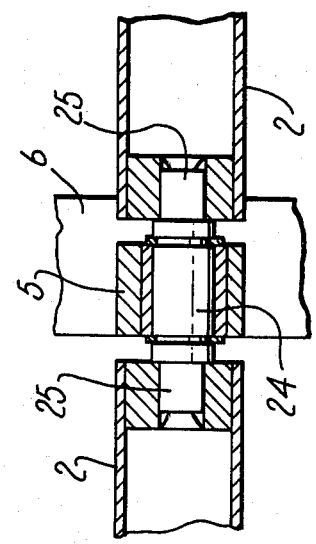

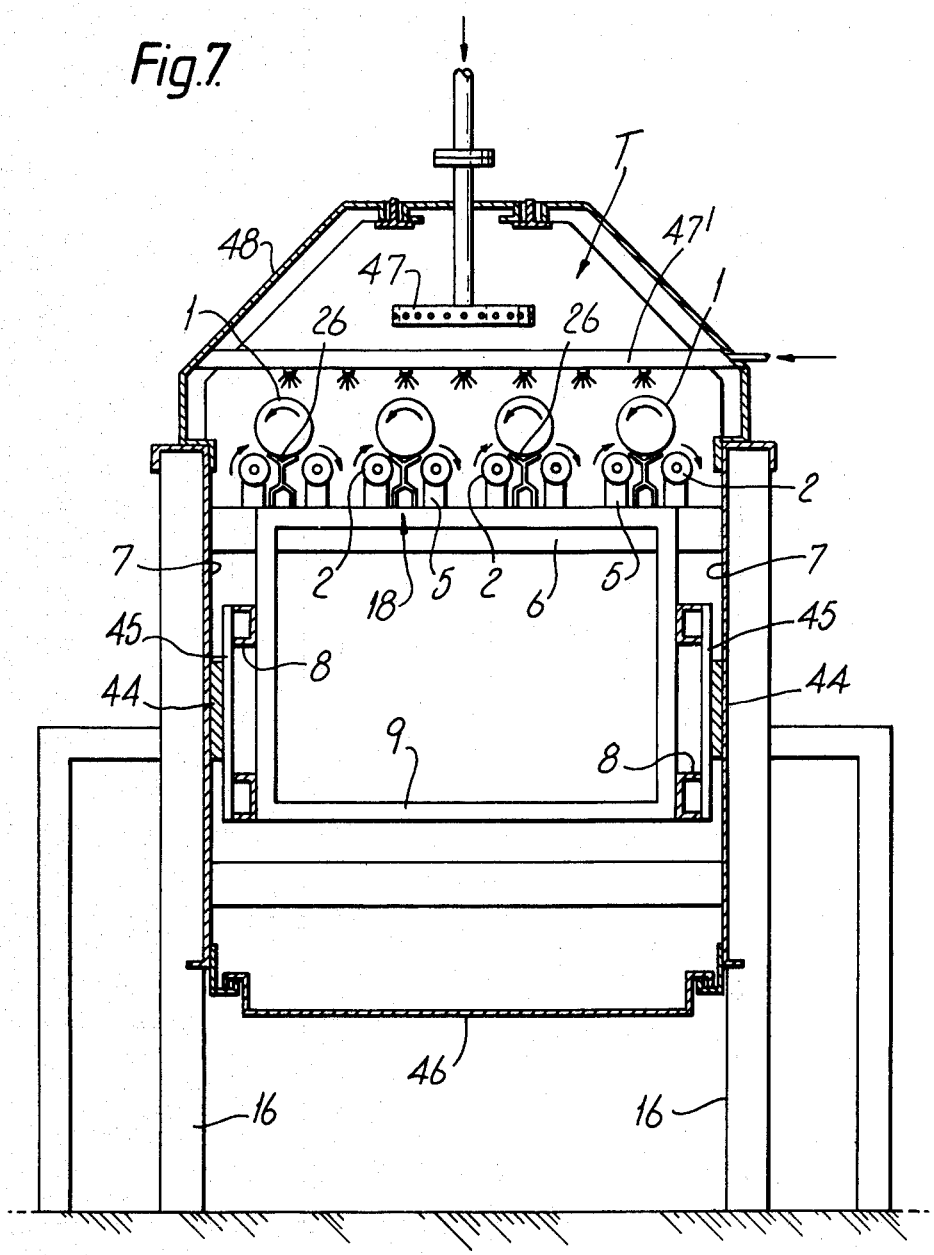

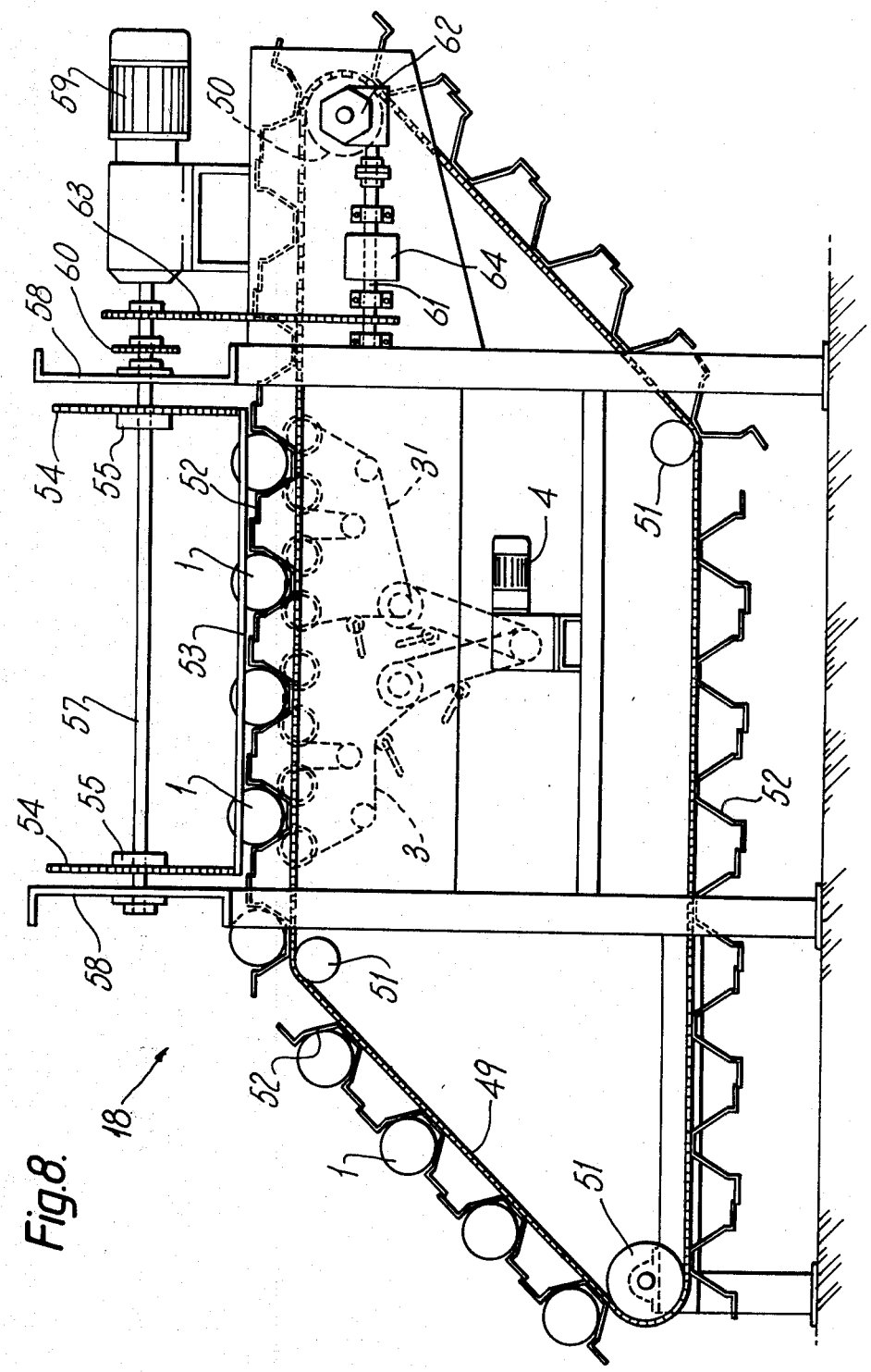

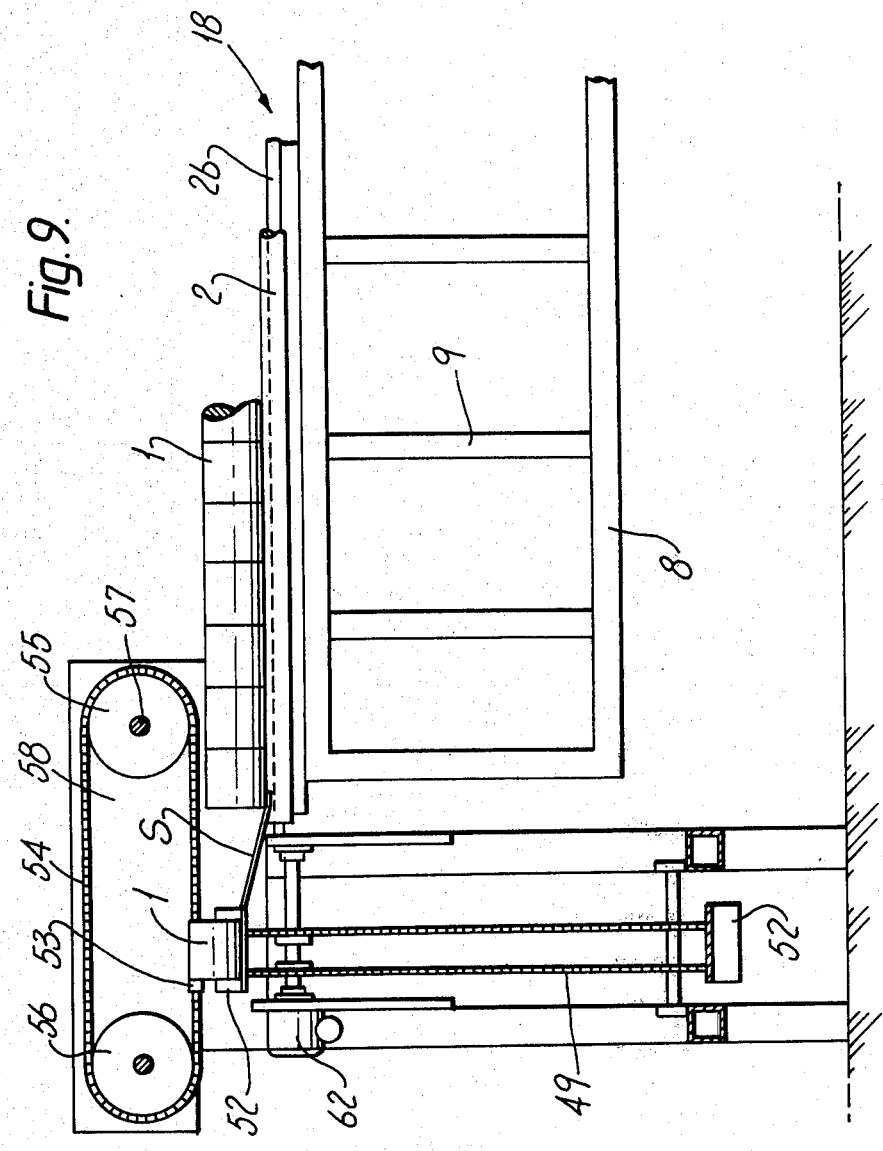

MACHINE FOR STERILIZING FOODSTUFFS IN CYLINDRICAL CONTAINERS AT NORMAL ATMOSPHERIC PRESSURE

BACKGROUND OF THE INVENTION

The invention relates to a machine for the sterilisation of foodstuffs in cylindrical containers carried out at normal atmospheric pressure, in fact, a machine designed to maintain the sterilisation temperature of preserved foodstuffs for a predetermined length of time,—products such as tomato paste, cherries, apricots, peaches, apples, pears, fruit juices, pickles, jams and other such edibles prepared for retailing in cans, or cylindrical tubs or containers similar thereto,—and—subsequently, to to cool and dry the cans themselves, the entire operation carried out under conditions of normal atmospheric pressure.

Current techniques in the field consist of mechanised units comprising a chain-driven horizontal conveyor with drag members, this located immediately immediately above a like conveyor having gear-driven rollers; the cans, introduced between the two conveyors, are gathered and—simultaneously—caused to rotate in alternation so as to undergo a rapid, and uniform sterilisation by steam; other machines incorporate a chain-driven horizontal conveyor having blades by means of which the containers are moved along in ranks, the blades being mounted immediately above a surface laid out in the guise of a roller shutter,—or indeed smooth—, whose function is to provide alternating movement by means of an appropriate form of drive attached thereto, and impart the same to the cylindrical cans positioned therebetween in order to achieve a uniform sterilisation of the latter's contents by virtue of their rolling back and forth; yet another kind of machine is designed to sterilise cans arranged vertically, in rows, upon longitudinal stationary bars and like longitudinal movable bars, the latter inserted between the former and furnished with a capacity for alternating vertical movement, by means of which the cans are lifted, horizontal movement forward, by means of which the same are carried along, vertical movement by means of which the row of cans is brought to rest on the respective stationary bars, and horizontal movement by means of which to return to the original lifting position; the said longitudinal bars thus proceed by degrees, in a fashion known as "a passo di pellegrino," hereinafter referred to as "pilgrim step".

The techniques, such as they are, stand in need of further refinement with regard to the following: sterilising machines incorporating a chain-and-roller system are complex, and involve lengthy and costly maintenance operations; those machines which make use of a blade-and-alternating motion surface lead to poor handling of the product and, in the case of the roller-shutter type, to actual bursting of the cans, moreover, in the case of a smooth surface being adopted, the sliding away of cans owing to a distorted blade causes an inevitable shortfall in production due to inefficiency, this in addition to the elevated cost of plant, as the system calls for multi-level disposition of the cans; an effective homogenous penetration of the product in the can is not achieved by sterilising in the case of the third mentioned kind of machine, the pilgrim step machine. Besides the already listed drawbacks, the chain-and-roller, and the blade arrangements outlined in the first two kinds of machine present the further disadvantage that, in addition to their want of improvement functionally, they do not allow a diversity of shapes and sizes of product for sterilisation.

The above resume demonstrates a need for solution of those problems posed by a technique which will produce a simple sterilising operation, carried out by a machine arranged on one single level which, in addition to being inexpensive at the outset and requiring no special maintenance, effects the aforesaid operation uniformly and speedily as well as moving the cans and their contents briskly through the cycle.

SUMMARY OF THE INVENTION

The invention resolves the above-mentioned technical problems by adopting a means whereby the cans move in a longitudinal direction through pilgrim step advancement whilst rolling transversely, the latter movement being interrupted only by the execution of the former; the combined movements effected upon, and along the length of a longitudinally disposed cage furnished uppermost with upward-facing V-shaped longitudinal supports, these designed for lifting the actual cans from pairs of longitudinally disposed adjacent rollers, in order to permit the said pilgrim step advancement, and redeposing them thereon so as to resume rotation on completion of the single advanced step, while being supported by the actual rollers. The advantages offered by the machine to which the invention relates are the following: a 50%, or better, improvement in speed of sterilisation; a more integrated and compact unit; a reduction in overall dimensions; a reduction of 60%, at least, in the cost of building and running the machine; drastically reduced incidence of wear and tear; virtual elimination of maintenance; simplified function; a notably more gentle handling of the product; better homogenisation of the sterilised product, and reduced consumption of steam.

BRIEF DESCRIPTION OF THE DRAWINGS

One form of embodiment of the invention is described here, by way of example, with reference to the accompanying drawings, in which:

FIG. 1 shows a longitudinal, vertical cross-section of the machine carrying out its sterilising cycle, wherein rows of cylindrical containers revolve upon longitudinally disposed rollers in order to facilitate a genuinely homogenous sterilisation of the product contained therein;

FIG. 2 shows the lateral elevation of the machine in FIG. 1;

FIG. 3 shows the plan of a portion of the machine illustrated in FIG. 1, part cut-away and enlarged;

FIG. 3' shows the cross-section of a part of one of the roller joints;

FIG. 7 shows the enlarged, vertical, transverse cross-section of FIG. 2 according to VII—VII, with the enclosing structure in evidence;

FIG. 8 shows an enlargement of the rear of the machine illustrating the device for feeding of the cans thereinto, and demonstrating the manner in which drive is transmitted to the support rollers, hence to the cans themselves;

FIG. 9 shows a partial cross-section of the feeder device, executed according to a vertical and longitudinal plane.

DESCRIPTION OF THE PREFERRED EMBODIMENT

Figure 4:
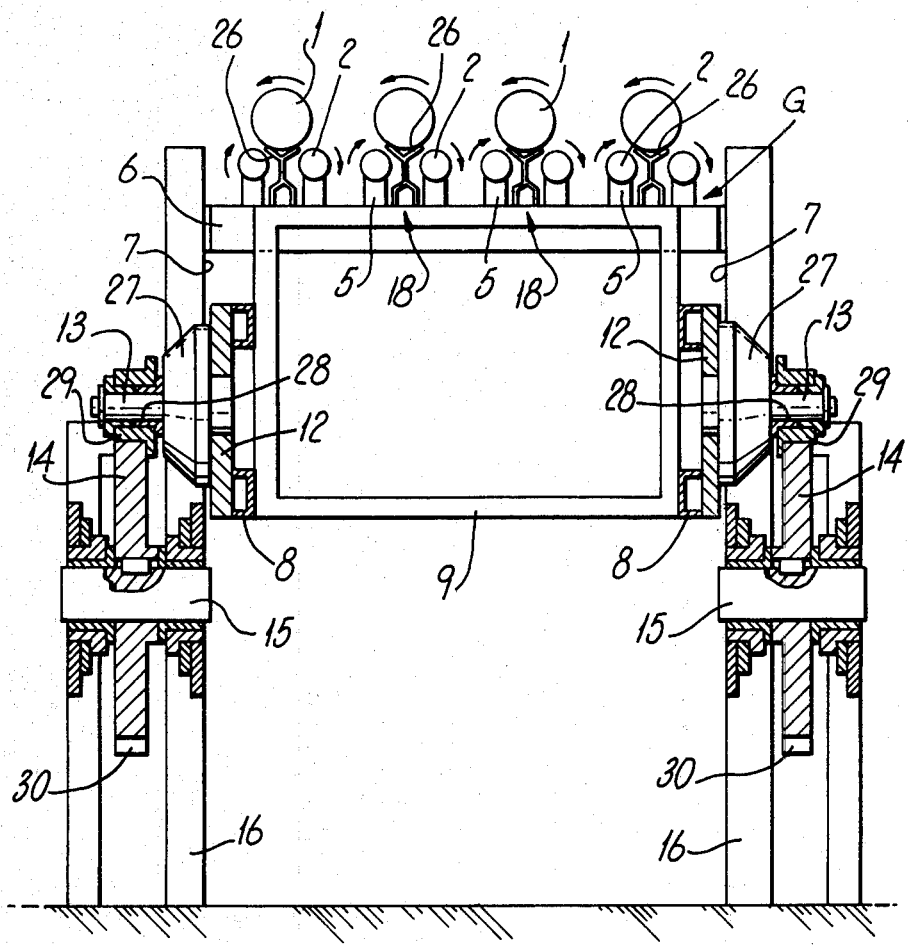
FIG. 4 shows the vertical, transverse cross-section of FIG. 2 according to IV—IV.
Figure 5:
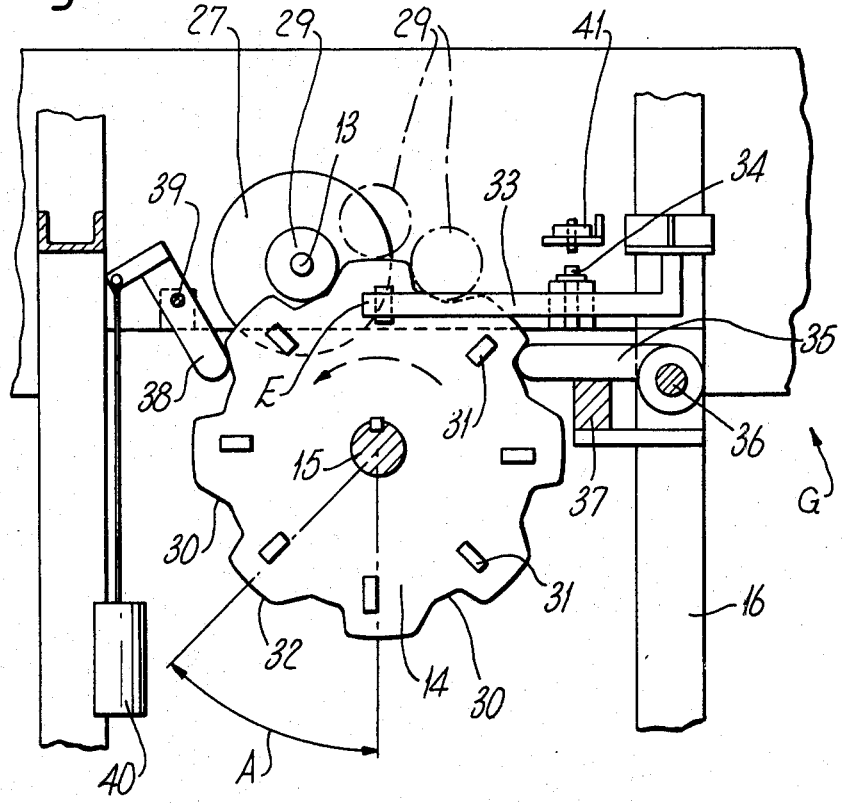
FIG. 5 shows an enlargement of part of the lateral elevation in FIG. 2, in which the device for self-advancement of the cans by alternate lifting and forward movement of the movable bearer frame can be more clearly seen.
Figure 6:
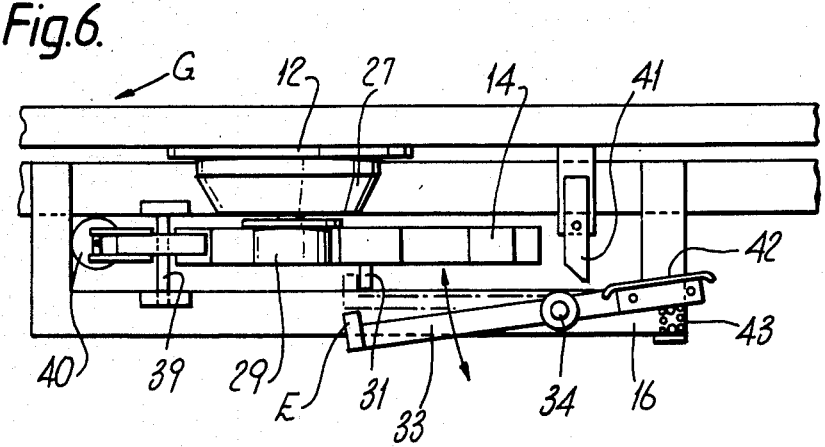
FIG. 6 shows the plan of the preceding figure.

With reference to the drawings, No. 1 denotes the cylindrical containers,—or cans—, for sterilisation arranged longitudinally in files, or lines, or rows upon transversely arranged pairs of longitudinally disposed series of roller lengths 2, rotating in like direction continuously, by means of chains 3 & 3' the latter driven by reduction gear 4; 5 denotes the support joints between each of the roller lengths 2; the said joints are fastened to a traverse 6 beneath which connects the two flanks 7 of the machine's basic framework; 8 denotes two pairs of longerons, connected by a longitudinally disposed succession of frames 9 so as to form a cage G, the latter furnished with a capacity for alternating lifting and forward movement in a longitudinal direction, raising-,—through not sliding—, the containers 1 by way of variable-speed motor 10 which drives transverse shaft 11 (in FIG. 2); a succession of pairs of longitudinally disposed lateral plates, denoted by 12, and fastened to pairs of longerons 8, are furnished with outward-facing transverse pivots 13 each resting on a relative sawtoothed cam 14, which in turn is splined onto a shaft 15 beneath, the latter mounted on the basic framework 16 so as to rotate with respect to same; 17 denotes the feeder device for the said containers 1; 18 denotes the parallel longitudinal supports for containers 1, fashioned from profiled metallic plate, their lower extremities resting upon the uppermost face of succession of frames 9, and interpositioned between each of the pairs of rollers 2; (in FIG. 3) an eccentric cam 19 attached to the inward extremity of shaft 11, is hinged to the foot 20 of rod 21, whose lunette engages a transverse pivot 22 fastened to a pair of longitudinal elements 23 which connect two of said frames 9; (in FIG. 3') 24 denotes a cylindrical element serving to connect two consecutive roller 2 lengths, provided on both sides with prismatic pins 25, which insert into corresponding prismatic apertures located at the extremities of each said roller length thus disallowing rotation thereof; (in FIG. 4) a pair of wing elements disposed in V formation and denoted by 26, extends upward from each of the supports 18 in order to accommodate a longitudinally disposed line of the cylindrical containers 1; an appropriate space is left between each pair of rollers 2 in which the said pair of wings describes its vertical path; 27 denotes the hub relative to each plate 12, from which pivot 13 projects; 28 denotes a bush mounted onto each of the pivots 13, rotating around which, and supported thereby, is a roller 29, designed to insert into the peripheral notches 30 of cam 14; (in FIG. 5) 31 denotes dogs, located on the outward, frontal face of cam 14 whose number corresponds to that of the number of cogs 32 on the cam itself, and whose function is that of arresting the cam by engaging extremity E of lever 33, the latter mounted at fulcrum 34 on the basic framework 16, with every advancing stage of the the cage G; 35 denotes a ratchet hinged to the basic framework 16 at point 36, which engages notches 30 thus allowing the cam 14 to rotate only in the one direction; 37 denotes a stop for ratchet 35 constituting its downward limit of rotation; 38 denotes a further ratchet hinged to the other side of the basic framework with respect to ratchet 35, at point 39; the lower extremity of said ratchet 38 engages with the notches 30, whilst the upper extremity of same is subject to the influence of counterbalancing weight 40; the balancing of cam 14 is thus achieved; 41 denotes an appendage located laterally with respect to, and oscillating upon, movable cage G designed to knock against, and slide along a skid 42 (in FIG. 6) incorporated with lever 33,—the latter movement counteracted by a spring 43—, thus to bring about the interception of rightangled extremity E of the lever itself by one of the lateral dogs 31 of cam 14; (in FIG. 7) 44 denotes longitudinal slides fastened outwardly of and to lateral plates 45 on either side, said lateral plates fixed firmly at their extremities to longerons 8 in order to provide for sliding of the same against, and centring of the same with respect to the flanks 7 of the machine; 46 denotes a driptray in which the eventual condensation is collected; 47 denotes the arrangement of sterilising vapour jets which act on the containers 1 and their contents in a first portion of the machine's length; 47' denotes sprinkler tubes for the playing of atomised water onto the containers 1, positioned so as to cool the same during the last part of their passage prior to the final stage wherein drying is effected by hot air means (not illustrated); the means thus described by 47 & 47' are supported by the machine's longitudinal hood 48 which is mounted on the basic framework 16 so as to establish a tunnel T; (in FIG. 8) 49 denotes a pair of chains, disposed within rearward transverse parallel planes, wound about a pair of cogged drive wheels 50 and a further pair of return wheels 51; a succession of like consecutive transverse elements 52 having a V-shaped profile, fixed between the said chains 49, serve to gather the containers into a disposition corresponding to that of supports 18; 53 denotes a transversely disposed pushing agent fixed between a pair of vertical and longitudinally disposed chains 54, the latter in turn wound about two pairs of cogged wheels 55 & 56 (see FIG. 9), the first pair of which put in rotation by a shaft 57 supported on, and rotating thus with respect to, the upper flank elements 58 of aforementioned device 17; 59 denotes a reduction gear which drives said shaft 57 by way of a further chain 60, and which drives the shaft 61 relative to reduction gear 62 by way of still further chain 63; 64 denotes an electromagnetic clutch relative to shaft 61; a chute, appropriately profiled for guidance of the containers from said elements 52 into the spaces existing between each pair of rollers 2 separated by a single longitudinal support 18, is denoted by letter S.

The function of the machine is as follows:

Once the various reduction gears and variable speed motors have been put into operation, the containers 1 are brought to the start of chain pair 49 which provide for lifting of each of the containers and deposition of the same into one single transverse element 52 of the succession of like V-shaped elements 52, which effects transfer of the containers to a suitably positioned transverse horizontal plane at the head of the machine, slightly elevated with respect to that horizontal plane containing the axes of said longitudinal rollers 2, the latter revolving in a clockwise direction; a microswitch, operated by the transverse agent 53 relative to chain pair 54, causes the movement of chain 49 to cease, thus allowing the said agent 53 to push the containers 1 in a longitudinal direction toward and into the spaces existing between each pair of rollers or roller lengths 2, downwards and forward by way of chute S, which aids guidance of the said containers 1 into that previously described disposition upon the respective longitudinal supports 18; thus the containers 1, having been brought to rest between already rotating (clockwise) roller lengths 2, revolve in an anticlockwise direction thereby causing a rapid and homogenous heating of the product contained within the cans by effect of the steam emitted from the jets 47 at slightly greater than atmospheric pressure, this last taking place within the first portion of tunnel T; the lifting components forming part of the alternating "pilgrim step" movement incorporated longitudinally into the said cage G, then cause the longitudinal supports 18 fixed to the upper surface of the succession of frames 9 defining the cage itself, to be raised, bringing the said supports' 18 pairs of V-shaped wing elements 26 into contact with the underside of the containers 1 and lifting them clear of the rollers 2 so as to effect their advance by a step equal to that made by cage G itself, the distance of the said step being determined by that of angular step A (in FIG 5) and by the diameter of the cam pairs 14, in whose pairs of notches 30 defined by the previously described saw-toothed profile the roller pairs 29 mounted on pivots 13 of the hubs 27 relative to plate pairs 12 mounted on cage longerons 8 are destined to be inserted; it should be observed that lifting of the rollers 29 on cage G is effected by the crest portion of cogs 32 on cams 14; the anticlockwise rotation of the said cam is halted at each step by engagement of the extremity E of lever 33 with dog 31 coming about at the end of the forward stroke made by the rod 21; during the course of the said rod's 21 return stroke the cam pairs 14 rotate through one angular step A in a clockwise direction, thus retaining the roller pairs 29 in the relative notches 30 gained by the same during the advance step; the action is repeated thus until the containers reach the forward limit of the series of rollers 2; in the first stage of their passage through the tunnel T, the revolving containers are subjected,—for a certain suitable distance—, to vapour jets as described previously in 47, and, for the remainder of the said passage to atomised and chilled water sprinkled from like means 47'; the containers emerge at the end of tunnel T cooled, and finally, dried, and are dispatched from thence to a packaging unit.

In practice, the materials, dimensions and construction particulars of the invention may be modified, or indeed different from those described in the form of embodiment herein, whilst retaining an equivalent technical character, and by no means straying from within the framework of protection afforded to the concept behind the invention as described above and as claimed below.

What is claimed is:

1. A machine for sterilizing foodstuffs in cylindrical containers at normal atmospheric pressure, furnished with means for pilgrim step forward movement of the containers, in which the latter revolve about their own axes, comprising a device for feeding the said containers to the machine, a tunnel, a first stage of which subjected to the effects of steam and a final stage of which subject to those of chilled atomised water and, eventually, air, characterised by the fact that it comprises: a longitudinal cage furnished with a capacity for longitudinal pilgrim step motion by means of a variable speed motor, provided uppermost with parallel longitudinal supports whose upward extremity consists of a pair of wing elements opening upwards in V-formation and designed to bear up a row, or line, of containers during that phase of the cage's movement upwards and forward; at least one pair of longitudinal stretches of roller comprising longitudinal lengths connected by support joints fastened to the upper traverses of the machine flanks which extend upwards from the basic framework, the said rollers revolving in like direction by means of a reduction gear, and positioned such that each roller pair straddles the space defined by each said longitudinal support, at a mutual distance allowing passage between said roller pair of the said pair of wings, the said rollers being designed to support a line of containers revolving about their own axes during that phase of the cage's movement downwards and in return.

2. Sterilizing machine according to claim 1, characterised by the fact that the said cage is comprised of a succession of vertically disposed and longitudinally distanced frames, connected uppermost to the said longitudinal supports, and laterally to two pairs of longerons along the length of which are fastened pairs of lateral plates each provided outermost with a hub from which extends a pivot coupled with and rotating with respect to a roller; each of the said rollers resting, when idle, in the notch located between each pair of cogs of a saw-toothed cam whose shaft is mounted so as to rotate with respect to the basic framework; a ratchet hinged to the structure itself and counterbalanced by a weight seeks out the notches in order to balance the cam, whilst a further ratchet seeks out a notch on the cam's opposite side thus preventing reverse revolution of the same; the variable speed motor transmits drive by way of shaft, eccentric cam and rod to the pivot relative to a pair of longitudinal elements interconnecting two of the frames of the said cage.

3. Sterilizing machine according to claim 2 characterised by the fact that the saw-toothed cam is provided with dogs disposed frontally and circumferentially, being equal in number to the cogs on the cam itself, said dogs constituting the stop for the cam's counter-rotation by engaging the right angled extremity of a lever, tha latter mounted on a fulcrum incorporated into the basic framework, and thus engaging by dint of lateral oscillating appendage protruding from cage and striking a skid located at the opposite extremity of the said lever to that which effects the said engagement.

4. Sterilizing machine according to claim 1 characterised by the fact that the lines of containers are formed upon the parallel roller pairs by means of the forward action of a pushing agent, the latter furnished with vertical and longitudinal chain pair and operating by contact with the base of said containers these being arranged transversely upon V-shaped elements at the head of the machine's roller format, so as to cause their descent thereonto by way of a chute.

* * * * *